April 3, 1951  O. WIKLUND  2,547,298
PROCESS FOR PURIFYING JUICE
Filed Dec. 27, 1948
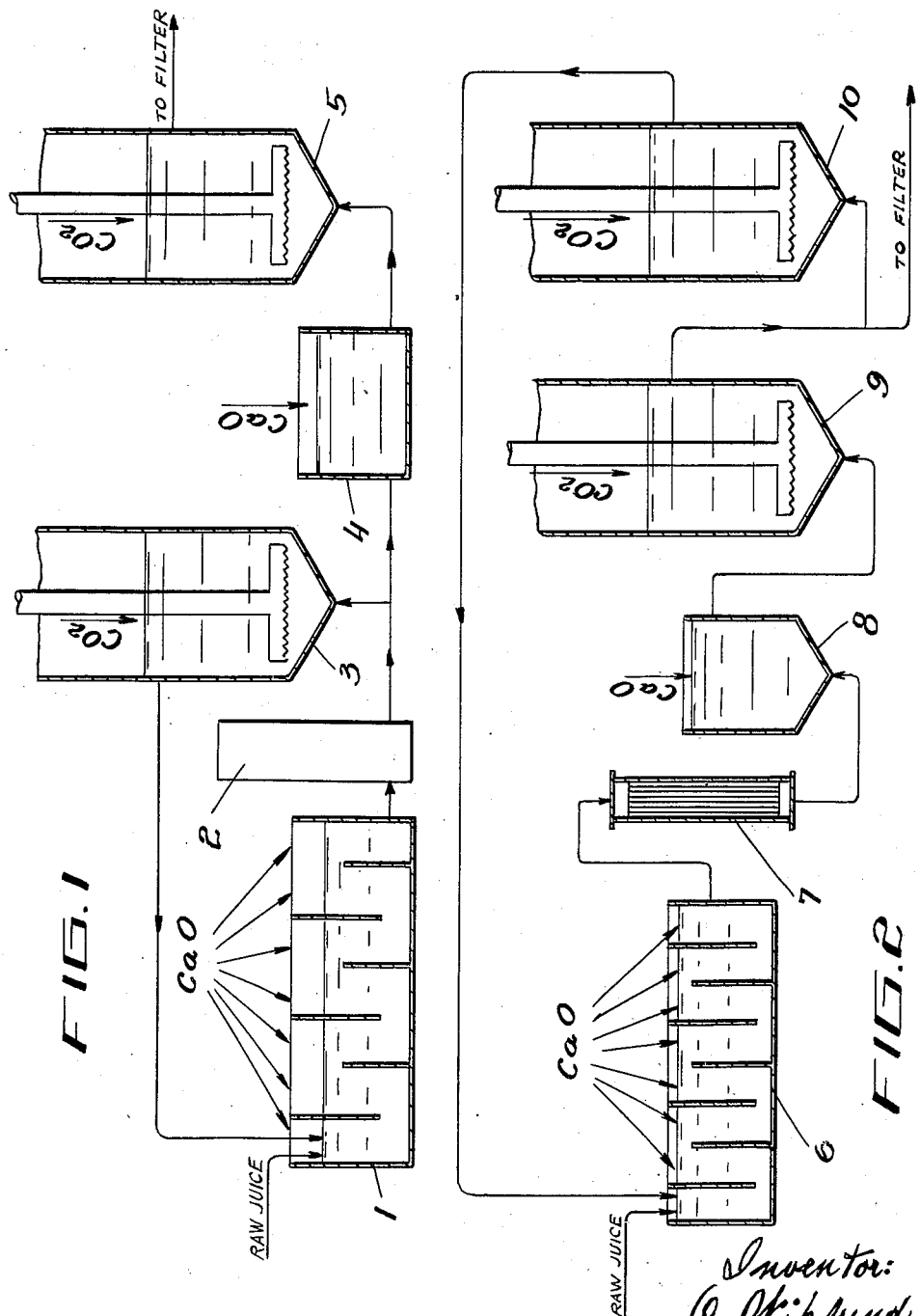

Patented Apr. 3, 1951

2,547,298

UNITED STATES PATENT OFFICE 2,547,298

PROCESS FOR PURIFYING JUICE

Olof Wiklund, Malmo, Sweden, assignor to Svenska Sockerfabriks Aktiebolaget, Malmo, Sweden, a corporation of Sweden Application December 27, 1948, Serial No. 67,383
In Sweden February 9, 1948

19 Claims. (Cl. 127—50)

This invention relates to a juice purifying process and particularly to the precipitation of the colloidal impurities contained in the juice obtained from the beets in beet sugar manufactories, though the invention may be applicable also in other industries treating extract solutions from other plants than beets.

The chief object of the invention is to facilitate the separation by filtration or the like of the precipitated impurities from the juice or extract solution. Further and more specific objects of the invention will become apparent to those skilled in the art from the following explanatory description.

The extraction of sugar (sucrose) from sugar beets is generally effected in the following manner. The beets are topped, washed with water, and cut into thin slices. By means of water the sugar is extracted from the slices in a diffusion battery. A dark-coloured aqueous solution (raw juice) is obtained, which, besides sugar, contains various other substances deriving from the beets, such as potassium and sodium salts of organic acids, betain, pectins and proteins and dark-coloured substances. To the raw juice there is then added lime either in the form of unslacked lime or milk of lime (dry or wet defecation) to precipitate not only low-soluble calcium salts of inorganic and organic acids but also the greater part of the pectins and proteins. The mixture of raw juice and added lime is called defecation juice. This defecation juice is heated, whereafter carbonic acid gas is introduced (first carbonation, also called first saturation) to precipitate the lime as calcium carbonate. At the same time the remaining pectins and proteins are precipitated as completely as possible. The greater part of the dark-coloured substances is also eliminated. The scummy solution obtained by the first carbonation is called scum juice. The scum juice is filtered, whereby the scums or sludge and the juice of the first carbonation are obtained. The precipitation of impurities is most effective when the titratable alkalinity of the juice of the first carbonation corresponds to about 0.08 gram CaO per 100 milliliters (with phenolphthalein as indicator). In the sugar industry, alkalinities are always expressed in this unity. The juice of the first carbonation contains dissolved lime in the form of calcium saccharate. In a second carbonation or so called saturation the lime is precipitated, by means of carbonic acid, in the form of calcium carbonate which is filtered off, whereby the juice of the second carbonation is obtained. The precipitation is usually most effective when the alkalinity of the juice of the second carbonation corresponds to 0.015 to 0.020 gram CaA per 100 milliliters (the optimum alkalinity of the second carbonation). The juice of the second carbonation is a clear, more or less yellow liquid. In a multiple-effect evaporator it is evaporated into thick juice. The thick juice is evaporated in vacuum evaporators, whereby a great part of the dissolved sugar is crystallized. In centrifuges the crystallized sugar is separated from the mother liquor. The sugar is obtained in the form of raw sugar, which consists of relatively pure sugar crystals surrounded by a yellowish-brown layer of mother liquor.

The raw sugar is purified (refined) in refineries, so that white sugar is obtained for direct consumption. The raw sugar should have as little colour as possible, since it is generally easier to refine a bright raw sugar than a more dark-coloured one. Bright raw sugars are obtained if the purified juices of the raw sugar manufactory have as little colour as possible. The colour of the purified juices is influenced by the chemical composition of the beets and by the method according to which the juice purifying process (the defecation and the first carbonation) is carried out. The said process must be carried out in such a manner that the juices will become as bright a colour as possible. At the same time, however, the process must be conducted in such a way that the forming sludge will be as easy as possible to filter off, since otherwise the requisite filter station will be unnecessarily big and costly. The demand as to good filterability of the sludge is very important especially when automatic, revolving filters are to be used, which is desirable with regard to the saving of labour. Before the automatic filters there are usually inserted concentrators in which the sludge is concentrated to a smaller volume of the juice, while the greater part thereof is run off from the concentrators directly to the second carbonation as clear juice. The concentrated sludge mixture only is sent to the automatic filters. By proceeding in this way the said filters will be less loaded than if the whole quantity of the carbonated juice would have been filtered through them. The concentrators are often in the form of automatic filters of a simplified construction, but sometimes they are constructed as settling apparatuses in which the sludge is concentrated by sedimentation. In the latter case it is necessary for the sludge to settle rapidly, since otherwise the requisite settling apparatuses would become excessively big.

The juice purifying process has been subject to much research work, and a great many modifications have been applied during the course of years. The following is one of the best processes hitherto known. The raw juice is first predefecated with a small amount of milk of lime. According to a method indicated by Dědek, the predefecation is carried out as follows. To the raw juice there are successively added small, usually equal, amounts of milk of lime, until the alkalinity of the defecated juice corresponds to about 0.2 to 0.3 gram CaO per 100 milliliters. The juice is not heated during the pre-defecation, and its temperature (about 40° C.) is the same as when the juice leaves the diffusion battery (cold, wet pre-defecation). To the pre-defecated juice there is then added at a time so much milk of lime that the alkalinity is raised to 1.0 to 1.3 gram CaO per 100 milliliters. The temperature is still held at about 40° C. (cold, wet main defecation). The resulting juice is heated to about 85° C. and is carbonated with carbonic acid in the usual manner. This juice purifying process generally yields juices of which the colour is very satisfactory. The filterability of the sludge, too, is better than when older and more primitive methods are used. In Sweden, however, experiments have proved that the sludge is not so easily filterable that it is economically feasible to use automatic, revolving filters.

The present invention relates to a juice purifying process, particularly for purifying raw juice of sugar beets, by means of which an extremely easily filterable sludge is obtained in the first carbonation. The colour of the purified juice is not remarkably darker than when using Dĕdek's method. The invention is based upon the following considerations and experiments.

The colloidal substances to be separated by defecation, carbonation and filtration comprise pectins and proteins. In an alkaline solution these substances are negatively charged and thus they can be precipitated by the positively charged calcium ions. The pre-defecated juice already is of so high an alkalinity and contains so much lime that the colloids are precipitated relatively completely. The resulting precipitate is, however, very difficult to filter on account of its colloidal character. The lime added in the main defecating operation and transformed into calcium carbonate in the first carbonation serves as a filter aid and also absorbs some impurities, whereby a further purification is gained. The sludge consists of a mechanical mixture of, inter alia, precipitated colloids and calcium carbonate. The calcium carbonate as such is easily filterable, but the precipitated colloids have, on account of their small particle size and their gelatinous nature, a tendency of complicating the filtering. These difficulties might be eliminated if the precipitated colloids and the calcium carbonate crystals could be combined to larger aggregations so as to obtain a coarser and more easily filterable precipitate.

In the usual juice purifying process such a combination of precipitated colloids and calcium carbonate crystals is impossible for the following reasons. The colloids consist of pectins and proteins. The pectins comprise galacturonic acid molecules, and the proteins amino acids. Both substances contain carboxyl groups which are ionised in alkaline solution, so that the substances form negatively charged ions. The negative charge of these ions is, however, neutralized by the calcium ions added in the defecating operation, and this is the reason why the colloidal substances are precipitated in the form of small gelatinous particles that are almost uncharged. Therefore they cannot be absorbed on the calcium carbonate crystals which may be considered as positively charged.

If carbonic acid is introduced so that not only the lime added in the main defecating operation, but also at least part of that lime which otherwise neutralizes the pectin and protein ions, is precipitated in the form of calcium carbonate, the precipitated colloidal particles will be negatively charged and can be adsorbed on the calcium carbonate crystals, so that aggregations of calcium carbonate crystals and precipitated colloidal particles may form. It will be most suitable to carry on the carbonation until that alkalinity (lower than 0.025 gram CaO per 100 milliliters) has been reached, at which the calcium carbonate is least soluble, i. e. until the optimum alkalinity (0.015 to 0.020 gram CaO per 100 milliliters) of the second carbonation has been reached. Such a carbonation to an alkalinity lower than that at which the precipitation of the colloids is at its optimum, is called supersaturation. The risk of the colloids being dissolved again by this supersaturation is relatively small due to the fact that the colloids are precipitated in a practically irreversible form by the defecating operation.

Experiments have shown that aggregations of precipitated colloids and calcium carbonate crystals are really formed when the scum juice is supersaturated. The conglomerates, however, being held together by electrical forces only, may break, if the alkalinity is again raised to the optimum value of the first carbonation. It is therefore necessary or desirable to stabilize the conglomerates in one way or the other. This may for instance be done by adding raw juice to the supersaturated juice, whereupon the mixture obtained is pre-defecated, defecated, and carbonated in the usual manner. The result is that the colloids of the added raw juice are precipitated on the conglomerates and bind them together. If the procedure of supersaturation etc. is repeated, the conglomerates gain in size, and finally a very easily filterable sludge is obtained. Other ways of stabilizing the conglomerates are not excluded from the scope of the invention and may very well be conceived within the same.

The following laboratory experiment is quoted as illustrative of matters herein concerned. Raw juice from a sugar manufactory was pre-defecated with milk of lime at 40° C. according to Dĕdek's method to an alkalinity of 0.35 gram CaO per 100 milliliters. In the main defecating operation there was added milk of lime at 40° C. to an alkalinity of 1.15 grams CaO per 100 milliliters, whereafter the defecation juice was heated to 85° C. and carbonated to an alkalinity of 0.087 gram CaO per 100 milliliters. Thereby sample No. 1 was obtained, corresponding to a scum juice produced in the usual manner. The carbonation was continued to an alkalinity of 0.019 gram CaO per 100 milliliters. To the supersaturated juice thus obtained there was added an equal volume of raw juice, whereby the temperature was reduced to 63° C. The mixture was pre-defecated according to Dĕdek, defecated to an alkalinity of 0.60 gram CaO per 100 milliliters, heated to 85° C. and carbonated to an alkalinity of 0.078 gram CaO per 100 milliliters. Thereby sample No. 2 was obtained. The procedure (supersaturation, addition of raw juice, pre-defecation, main defecation, heating, first carbonation) was repeated several times, whereby samples Nos. 3, 4, 5, and 6 were obtained.

The properties of the scum juice were characterized with the aid of the following testing methods.

The settling ability of the sludge was measured, after the scum juice had been poured into a glass cylinder by observing the downward movement of the upper surface of the sludge layer. By the sedimentation coefficient S is meant the sedimentation velocity in centimeters per minute at the beginning of the sedimentation. S should be as high as possible.

The filterability of the sludge was examined by filtering it through a paper filter with a surface of 2 cm.$^2$ at a vacuum of 40 centimeters Hg. By the filtration coefficient $F_k$ is meant the requisite time in seconds for the obtaining volume of filtered juice to increase from 2 to 4 cm.$^3$. The first 2 cm.$^3$ passing through the filter are thus not taken into account. $F_k$ should be as low as possible.

The colour of the carbonation juice, i. e. its light absorbing ability, was measured after the pH of the filtered juice having been adjusted to 7 by means of dilute acid. The measuring was effected in a Pulfrich photometer provided with colour filter S47, for which reason the optic center of gravity of the light used was about 4630 Ångström. The result of the measurement was expressed as the decadic extinction coefficient $a$ with a layer thickness of 1 cm. and a calculated concentration of the juice of 1 gram dry substance per milliliter. $a$ should be as low as possible.

| Sample No. | 1 | 2 | 3 | 4 | 5 | 6 |
|---|---|---|---|---|---|---|
| S | 2.2 | 2.2 | 2.7 | 3.6 | 3.4 | 4.4 |
| $F_k$ | 12.1 | 7.0 | 3.6 | 2.9 | 2.1 | 2.9 |
| 1000 x $a$ | 689 | 781 | 698 | 688 | 617 | 677 |

In other experiments $F_k$-values of 1.1 to 1.7 have been reached.

In practice the principle of the invention may be utilized in various ways, and for the purpose of illustration two examples will be given in the following, reference being had to the accompanying drawings in which Figs. 1 and 2 diagrammatically illustrate one and the other, respectively, of these examples.

Referring first to Fig. 1, in the pre-defecating vessel 1 the pre-defecation is carried out by adding lime in small portions to different compartments of the vessel. The final alkalinity in the last compartment is held for instance at 0.5 to 0.6 gram CaO per 100 milliliters. In the pre-heater 2 the pre-defecated juice is heated for instance to 85° C. In the carbonation tank 3 part of the predefecated juice is carbonated with carbonic acid to an alkalinity of say 0.015 gram CaO per 100 milliliters. The carbonated scum juice from tank 3 is run back to the first compartment of the vessel 1, where it is mixed with raw juice. The aggregations of colloids and calcium carbonate, formed during the carbonation in tank 3, are stabilized, in the manner hereinbefore described, during the pre-defecation in the vessel 1. The rest of the pre-defecated juice is then subjected to a final defecation in the main defecation vessel 4 and is subjected to first carbonation in the carbonation tank 5 in the usual manner to an alkalinity of about 0.080 gram CaO per 100 milliliters, whereupon the juice is run to the filter station.

At present the invention is worked successfully in a Swedish raw sugar manufactory in accordance with the example illustrated in Fig. 2. As therein shown pre-defecation is carried out in a vessel 6 providing several, for instance eight, successive compartments in the first of which raw juice is mixed with preferably an equal volume of supersaturated juice coming from a carbonation tank 10. No milk of lime is added in this compartment. In the other compartments milk of lime is added so as to increase the alkalinity of the juice successively in accordance with the well-known Dědek method. When leaving the pre-defecation vessel 6 the juice has an alkalinity of preferably 0.2–0.3 gram CaO per 100 milliliters. The juice is now heated in a heater 7 to a temperature of 80–85° C. and run to a main defecation vessel 8 in which so much dry (unslaked) lime is added that the alkalinity of the juice is increased preferably to 0.7–0.8 gram CaO per 100 milliliters. The juice thus defecated is run to a carbonation tank 9, and when running to this tank the juice may be heated to about 90° C. in a second heater (not shown) connected between the vessel 8 and the tank 9. In the tank 9 the juice is carbonated in the usual manner with carbonic acid so that by this carbonation the alkalinity of the juice is reduced to about 0.08 gram CaO per 100 milliliters. Part (preferably one half of the scum juice from the carbonation tank 9 is run to the carbonation tank 10 and is there carbonated with carbonic acid so as to reduce the alkalinity to, for instance, about 0.03 gram CaO per 100 milliliters. The thus supersaturated juice is returned to the first compartment of the pre-defecation vessel 6 and should, in quantity, correspond to the continuous supply of raw juice to the said compartment. The rest of the scum juice from the carbonation tank 9 is sent to the filter station.

The above-described principle of precipitating negatively charged colloids in an easily filterable form may of course be employed also when purifying colloid-containing solutions other than raw juice from sugar beets, e. g. when purifying extracts from other plants.

What I claim and desire to secure by Letters Patent is:

1. The method of purifying sugar beet juice by predefecation and thereafter by main defecation with lime to an extent effecting substantially optimum precipitation of impurities in colloidal form and thereafter by treatment with $CO_2$ to effect saturation to an optimum alkalinity conducive to optimum precipitation of calcium carbonate along with impurities, and separation from the juice of the precipitates; characterized by subjecting predefecated juice to a first treatment with $CO_2$ for effecting its supersaturation beyond the degree normally required to attain optimum precipitation coincident with a significant reduction in alkalinity below optimum, effecting pre-defecation of the juice in the presence of a quantity of thus supersaturated juice with its precipitate, said quantity being sufficient to produce stabilized aggregations of precipitating matter with carbonate precipitate, subjecting the thus treated juice to main defecation and thereafter to a second treatment with $CO_2$ to effect saturation to an optimum alkalinity conducive to optimum additional precipitation, and separating the precipitate from the juice.

2. The method of purifying sugar beet juice according to claim 1, characterized by the fact that the addition of lime to the juice mixture during predefecation is conducted to an alkalinity of the order of 0.6 gram CaO per 100 milliliters.

3. The method of purifying sugar beet juice according to claim 1, characterized by the fact that super-saturation is carried to a point whereby there is effected a reduction in alkalinity to a value of the order of 0.015 gram CaO per 100 milliliters.

4. The method of purifying sugar beet juice according to claim 1, characterized by the fact that super-saturation is carried to a point of alkalinity of the order of 0.015 gram CaO per 100 milliliters, and that the second treatment with $CO_2$ is carried to a point of alkalinity that lies substantially at .08 gram CaO per 100 milliliters.

5. The method of purifying sugar beet juice according to claim 1, characterized by the fact that lime is added to the juice progressively during predefecation, and that supersaturated juice is added along with the initial portion of lime.

6. The method of purifying sugar beet juice according to claim 1, characterized by the fact that lime is added to the first-mentioned juice progressively during predefecation, and that an initial portion of the lime is added to the first-mentioned juice in the presence of supersaturated juice.

7. The method of purifying sugar beet juice according to claim 1, characterized by the fact that the first-mentioned juice and supersaturated juice are mixed in about equal parts.

8. The method of purifying sugar beet juice by continuous predefecation with lime being progressively added to the juice and to an extent effecting substantially optimum precipitation of impurities in colloidal form and thereafter by continuous saturation with $CO_2$ for effecting precipitation of calcium carbonate along with impurities, and separation from the juice precipitates; characterized by subjecting predefecated juice continuously to a first treatment with $CO_2$ to effect supersaturation coincident with a significant reduction in alkalinity to a point well below that which is conducive to optimum precipitation, effecting predefecation of the juice while continuously supplying thereto a substantial proportion of thus supersaturated juice including its precipitates whereby colloidal impurities precipitating form relatively stabilized aggregations with carbonate precipitate, subjecting the thus predefecated juice to maintain defecation and thereafter to a second treatment with $CO_2$ to effect saturation to a point of alkalinity conducive to effect optimum precipitation, and separating precipitate from the juice.

9. The method of purifying sugar beet juice according to claim 8, characterized by the fact that the supersaturated juice supplied is derived by continuous recirculation of freshly supersaturated juice.

10. The method of purifying sugar beet juice according to claim 8, characterized by the fact that the supersaturated juice is supplied along with an initial quantity of lime.

11. The method of purifying sugar beet juice according to claim 8, characterized by the fact that an initial portion of the lime is added to the first-mentioned juice in the presence of supersaturated juice.

12. The method of purifying sugar beet juice according to claim 8, characterized by the fact that the first-mentioned juice and the supersaturated juice are mixed in about equal parts.

13. The method of purifying sugar beet juice by defecation which comprises predefecation followed by main defecation with lime to an extent effecting substantially optimum precipitation of impurities in colloidal form, and thereafter by treatment of the defecated juice with $CO_2$ for attaining saturation of the juice to an optimum alkalinity conducive to optimum precipitation of calcium carbonate along with impurities, and separation from the juice of the precipitates; characterized by the fact that defecated juice is subjected to a first treatment with $CO_2$ for effecting saturation to an optimum alkalinity conducive to optimum precipitation, a portion of the thus saturated juice including its precipitate is subjected to a second treatment with $CO_2$ for effecting its supersaturation beyond the degree normally required to attain optimum precipitation coincident with a significant reduction in alkalinity below optimum, that the predefecation of the juice is effected in the presence of a quantity of thus supersaturated juice with its precipitate, said quantity being sufficient to produce stabilized aggregations of precipitating matter with carbonate precipitate, and that a quantity of first $CO_2$-treated juice is subjected to separation of precipitate therefrom.

14. The method of purifying sugar beet juice according to claim 13, characterized by the fact that the addition of lime to the juice mixture during predefecation is conducted to an alkalinity of the order of 0.6 gram CaO per 100 milliliters for precipitation of colloidal impurities.

15. The method of purifying sugar beet juice according to claim 13, characterized by the fact that supersaturation is carried out to a point whereby there is effected a reduction in alkalinity to a value of the order of 0.015 gram CaO per 100 milliliters.

16. The method of purifying sugar beet juice according to claim 13, characterized by the fact that the first treatment with $CO_2$ is carried to a point of alkalinity that lies substantially at .08 gram CaO per 100 milliliters, and that supersaturation is carried to a point of alkalinity of the order of 0.015 gram per CaO per 100 milliliters.

17. The method of purifying sugar beet juice according to claim 13, characterized by the fact that lime is added to the juice progressively during predefecation, and that supersaturated juice is added prior to the initial portion of the lime.

18. The method of purifying sugar beet juice according to claim 13, characterized by the fact that lime is added to the juice progressively during predefecation, and that an initial portion of the lime is added to the first-mentioned juice in the presence of supersaturated juice.

19. The method of purifying sugar beet juice according to claim 13, characterized by the fact that the proportion of first-mentioned juice to supersaturated juice is about one to one.

OLOF WIKLUND.

REFERENCES CITED

The following references are of record in the file of this patent:

UNITED STATES PATENTS

| Number | Name | Date |
|---|---|---|
| 2,143,594 | Cowan | Jan. 10, 1939 |

OTHER REFERENCES

Kutzev et al.: "Sugar," March 1943, pages 33 and 34. Copy in Scientific Library (167–50).

Troje: "Sugar," May 1942, pages 40 and 41. (Copy in Scientific Library (167–50).